No. 880,803. PATENTED MAR. 3, 1908.
S. A. M. LINVILLE & L. HICKS.
BRIDLE BIT.
APPLICATION FILED AUG. 2, 1907.
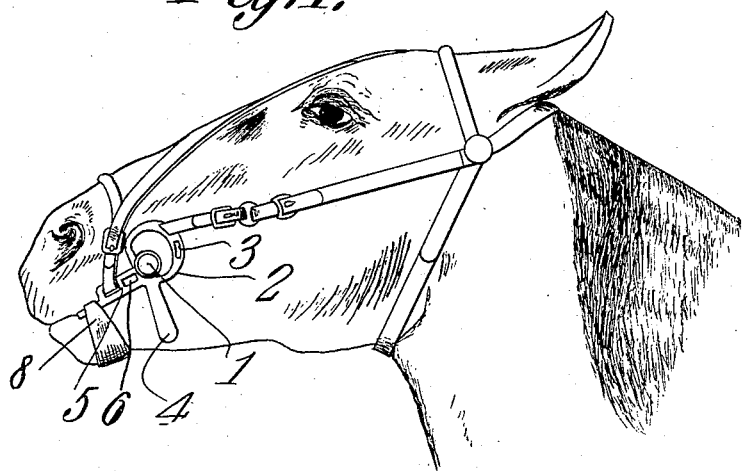
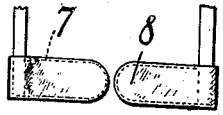
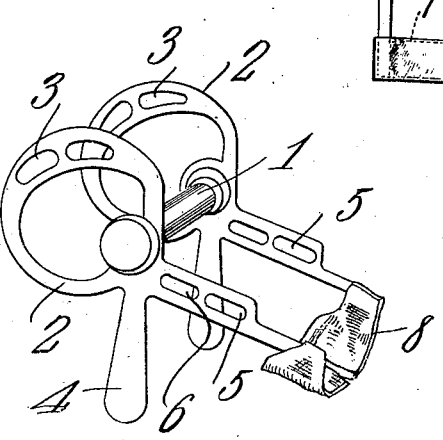
Stephen A. M. Linville,
Linzy Hicks
Inventors

UNITED STATES PATENT OFFICE.

STEPHEN ARCHIE MILLER LINVILLE AND LINZY HICKS, OF CONCORDIA, KANSAS.

BRIDLE-BIT.

No. 880,803.  Specification of Letters Patent.  Patented March 3, 1908.

Application filed August 2, 1907. Serial No. 386,853.

*To all whom it may concern:*

Be it known that we, STEPHEN ARCHIE MILLER LINVILLE and LINZY HICKS, citizens of the United States, residing at Concordia, in the county of Cloud and State of Kansas, have invented a new and useful Bridle-Bit, of which the following is a specification.

This invention has relation to bridle bits and it consists in the novel construction and arrangement of its parts as hereinafter shown and described.

The object of the invention is to provide a bit of simple and durable construction which is adapted to make a horse raise his head to prevent him from bowing the neck and to prevent lolling of the tongue and opening of the mouth when the animal is at work. The bit is also constructed so as to prevent the animal from running or kicking as it is impossible for him to lower his head. The bar of the bit is journaled in cheek pieces and hence the animal cannot crunch the bit. The parts are so assembled that the animal can be managed with ease.

In the accompanying drawing:—Figure 1 is a view of the bit applied, Fig. 2 is a perspective view of the bit detached. Fig. 3 is a plan view of jaw pallets provided upon the bit.

The bit consists of the bar 1, the ends of which are journaled in the cheek pieces 2. The said cheek pieces are substantially circular in configuration and are eccentrically disposed upon the said bar. The cheek pieces are provided with the openings 3 to which the head stall of the bridle may be attached. The cheek pieces are provided with the depending jaw guards 4 and with the forwardly extending arms 5 which are provided with opening 6 adapted to receive the overdraw of the bridle. The forward extremity of the arms 5 are provided with the oppositely disposed pallets 7 which are adapted to pass under the anterior portion of the lower jaw of the animal and upon which the said lower jaw rests. The pallets 7 are provided with covers 8, such as leather or other suitable material, adapted to prevent chafing of the animal. Thus it will be seen that a bit is provided with cheek pieces adapted to rotate independently in parallel planes and that the animal cannot lower its head for the reason that the overdraw is attached to the cheek pieces at points between the jaw pallets which lie under the anterior portion of the lower jaw and the bar which is between the jaws. Thus the animal cannot run or kick. For the same reason the animal cannot permit the lower jaw to droop while at work, thus, the tongue cannot hang from the mouth. By reason of the eccentric disposition of the cheek pieces 2 upon the bar 1 when the reins are drawn, which are attached to the said cheek pieces, at the openings thereof, the said cheek pieces are partially rotated, and the pallets are pressed against the lower jaw of the animal, thus, the animal may be managed with ease by one handling the reins. Should the animal have a habit of disposing its head to one side, or pulling to one side, the overdraw strap may be so adjusted as to cause the pallet on that side of the animal to bind, whereby, the animal, in its efforts to avoid the pressure, will hold its head straight or travel straight.

Having described our invention what we claim as new and desire to secure by Letters-Patent is:—

A bit comprising a bar, separate cheek pieces journaled for independent rotation around the longitudinal axis of the bar, arms carried by the cheek pieces, and separate jaw pallets carried by the arms.

In testimony that we claim the foregoing as our own, we have hereto affixed our signatures in the presence of two witnesses.

STEPHEN ARCHIE MILLER LINVILLE.
LINZY HICKS.

Witnesses:
 KATHERINE STUMP,
 L. WALKER.